(12) United States Patent
Kim

(10) Patent No.: US 8,660,116 B2
(45) Date of Patent: Feb. 25, 2014

(54) PRIVATE MULTIMEDIA CONTENTS BROADCASTING EQUIPMENT WHICH USES ISM RADIO FREQUENCY BAND OR 5GHZUNII RADIO FREQUENCY BAND, PRIVATE MULTIMEDIA CONTENTS BROADCASTING SYSTEM AND METHOD THEREOF

(75) Inventor: Jeen-Gee Kim, Icheon-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 511 days.

(21) Appl. No.: 12/446,768

(22) PCT Filed: Oct. 1, 2008

(86) PCT No.: PCT/KR2008/005768
§ 371 (c)(1),
(2), (4) Date: Apr. 23, 2009

(87) PCT Pub. No.: WO2009/088151
PCT Pub. Date: Jul. 16, 2009

(65) Prior Publication Data
US 2011/0002260 A1 Jan. 6, 2011

(30) Foreign Application Priority Data

Jan. 5, 2008 (KR) .................. 10-2008-0001509
Sep. 18, 2008 (KR) .................. 10-2008-0091660

(51) Int. Cl.
*H04L 12/28* (2006.01)

(52) U.S. Cl.
USPC ................ 370/389; 370/338; 370/400

(58) Field of Classification Search
None
See application file for complete search history.

(56) References Cited

U.S. PATENT DOCUMENTS

| 6,768,743 | B1 * | 7/2004 | Borella et al. ............... 370/401 |
| 7,054,944 | B2 * | 5/2006 | Tang et al. .................. 709/229 |
| 2004/0090958 | A1 * | 5/2004 | Park et al. ................... 370/389 |
| 2006/0218296 | A1 * | 9/2006 | Sumner ....................... 709/238 |
| 2008/0219230 | A1 * | 9/2008 | Lee et al. ..................... 370/338 |
| 2009/0292796 | A1 * | 11/2009 | Huang ......................... 709/222 |
| 2010/0121946 | A1 * | 5/2010 | Claes et al. .................. 709/223 |

FOREIGN PATENT DOCUMENTS

| KR | 10-2006-0037721 | 2/2006 |
| KR | 10-2007-0044701 | 4/2007 |
| KR | 10-2007-0047592 | 5/2007 |
| KR | 10-2007-0053907 | 5/2007 |
| KR | 10-2007-0095237 | 9/2007 |

* cited by examiner

*Primary Examiner* — Robert Wilson
(74) *Attorney, Agent, or Firm* — McKenna Long & Aldridge LLP

(57) ABSTRACT

An individual multimedia contents broadcasting equipment is disclosed, which includes an individual broadcast process unit which provides a private IP address through a DHCP (Dynamic Host Configuration Protocol) to a receiving terminal, which requests a connection, and makes a connection of the receiving terminal through a radio network, and transmits a broadcast content to the connected receiving terminal; and a radio communication unit which forms a radio network and communicates data with the connected receiving terminal through the radio network.

19 Claims, 7 Drawing Sheets

PRIVATE MULTIMEDIA CONTENTS BROADCASTING EQUIPMENT WHICH USES ISM RADIO FREQUENCY BAND OR 5GHZUNII RADIO FREQUENCY BAND, PRIVATE MULTIMEDIA CONTENTS BROADCASTING SYSTEM AND METHOD THEREOF

TECHNICAL FIELD

The present invention relates to a personal multimedia contents broadcasting equipment and a method thereof which provide functions for broadcasting multimedia contents such as a text data, a symbol data, a music data, a sound data, an audio data, a video data, an image data, a photo data or something, with their intellectual properties belonging to individuals, respectively, to a specific receiving terminal by using an ISM (Industrial Scientific Medical) radio frequency band or a radio 5 GHZ UNII (Unlicenced National Information Infrastructure) frequency band.

CITED REFERENCES

1. RFC2131 Dynamic Host Configuration Protocol, 1997. 3.
2. RFC3442 The classless Static Route Option for Dynamic Host Configuration Protocol (DHCP) version 4, 2002. 12.
3. RFC4280 Dynamic Host Configuration Protocol (DHCP) Options for Broadcast and Multicast Control Services 2005. 11.
4. RFC1918 Address Allocation for Private Internets, 1996. 2.
5. RFC3580 IEEE802.1x Remote Authentication Dial In User Service (Radius) Usage Guidelines, 2003. 9.
6. UO 2003-22652 (Honeywell Federal Manufacturing & Technologies, LLC), 2003, Jan. 30
7. Regulation improvement ways for Domestic ISM Industry Promotion [On-line], 2007. 4. ETRI. Trend analysis of Electronic and communication, 22-2nd book (Searched date: Nov. 6, 2007)
8. Introduction to ActiveX Controls [on-line], 2007. (Searched date: Nov. 6, 2007)
9. Windows media player [on-line], 2007. (Searched date: Nov. 6, 2007)

BACKGROUND ART

Generally, a conventional multimedia contents broadcast is equipped with a radio communication network for broadcasting multimedia contents whose intellectual properties belong to individuals, and uses a system of a service provider who provides an individual multimedia contents broadcasting service based on the above radio communication network.

In more details, an individual multimedia contents broadcast might be performed by using a system belonging to a service provider which is equipped with a DHCP server which allocates a public IP to an individual user for a connection with a service provider's network based on a radio communication network after an individual broadcast radio frequency band is reported to a public organ, which controls and manages a radio communication, and receives an authentication from the same; an authentication server which manages the processes that an individual user connects to a multimedia contents DB server which is set by the service provider; a multimedia contents DB server of the service provider which stores an original version multimedia contents or edited multimedia contents whose intellectual properties belong to individual users; and a playback tool storing server which provides playback tools so that a certain user can playback a corresponding multimedia contents stored in the multimedia contents DB server of the service provider.

However, it is disadvantageous that an individual multimedia contents broadcast using a service provider's system should use a radio frequency band authenticated by a public organization which controls and manages a radio communication, and an individual user should pay a service charge for the use of a radio communication network and should further pay a service charge for the use of a public IP address used for a connection with the service provider's system. In addition, the individual users should all request services on the use of a service provider's system so as to use a multimedia contents DB server of the service provider. The individual users are needed to have individual user's authentications from the service providers all the time whenever connecting to the service provider's system. The individual users should use the above system even though they feel a lot of inconvenience in the use of the above systems. In worse case, it is needed to assign the intellectual properties of the multimedia contents belonging to the individual users to the service provider.

DISCLOSURE OF INVENTION

Accordingly, it is an object of the present invention to provide private multimedia contents broadcasting equipment which uses an ISM radio frequency band or 5 GHz UNII radio frequency band, a private multimedia contents broadcasting system and method thereof which overcomes the problems encountered in the conventional art.

To achieve the above objects, an individual multimedia contents broadcasting equipment which comprises an individual broadcast process unit which provides a private IP address through a DHCP to a receiving terminal, which requests a connection, and makes a connection of the receiving terminal through a radio network, and transmits a broadcast content to the connected receiving terminal; and a radio communication unit which forms a radio network and communicates data with the connected receiving terminal through the radio network. The individual multimedia contents broadcasting equipment includes an input unit which has at least one among an operation unit, a microphone and a camera for producing multimedia contents; and an output unit which has a display unit and a speaker for playing back the broadcasting multimedia contents, and the individual broadcasting process unit creates and stores a broadcast content using a data inputted through the input unit depending on a broadcaster's operation and outputs the multimedia contents stored or received depending on the broadcaster's operation through the output unit.

The radio network uses either an ISM (Industrial Science and Medical) radio frequency band or a 5 GHz UNII radio frequency band.

The individual broadcasting process unit includes a broadcast module which creates and stores a broadcast content using a data inputted through the input unit and provides a temporary IP address to the receiving terminal, which requests a connection, and makes a connection of the receiving terminal through a radio network, and transmits a broadcast content to the connected receiving terminal; a storing device which stores an individual broadcast multimedia content created by the broadcast module; and a controller which controls the broadcast module, the storing device, the input unit, the output unit and the radio communication unit in accordance with a control signal inputted through the input unit for thereby performing an individual multimedia content broadcast.

The individual multimedia contents broadcasting equipment transmits one content among an individual broadcasting multimedia content created in real time from the content creation module depending on a broadcaster's operation, an individual broadcast multimedia content stored in the storing device, an individual broadcast multimedia content which is created in real time, and a content which is combined with the individual multimedia contents stored in the storing device.

The broadcast module includes an input and output module for controlling a data input through the input unit and a data output through the output unit; an individual broadcast process module which creates a multimedia content in real time by using a data inputted through the input unit, and allocates a private IP addess through a DHCP function to the receiving terminal which requests a connection, and sets a connection, and retrieves the provided private IP address and disconnects the connection; and a radio communication module which broadcasts an individual broadcast multimedia content based on the broadcaster's operation to the connected receiving terminal by controlling the radio communication unit.

The individual broadcast process module includes a content creation module which creates a multimedia content in real time by using a data inputted through the input unit; a DHCP module which allocates a private IP address through a DHCP function to a receiving terminal which requests a connection, and sets a connection, and retrieves the allocated private IP address and disconnects the connection; and a private IP address management module which stores and manages the private IP address information which might be allocated to the receiving terminal and the allocated private IP address information.

The individual broadcast module includes a playback tool management module which automatically install a multimedia content playback tool when the connected receiving terminal does not have a content playback tool for thereby playing back the multimedia contents; an authentication module which performs an authentication by using information from the connected receiving terminal and permits a receipt when the authentication is allowed, and when the authentication is failed, it retrieves the allocated private IP address and disconnects the connection; and a connection terminal management module which monitors in real time connection information including at least one between the number of connected receiving terminals and a connection state and indicates the current connection information through the output means periodically.

The individual multimedia content broadcasting equipment forms an independent network for an individual broadcast using a private IP address through the DHCP function.

The individual multimedia content broadcasting equipment receives an allocation of the private IP address of another individual multimedia content broadcasting equipment for thereby receiving broadcast, and the individual multimedia content broadcasting equipment is capable of performing a relay broadcast which requests a receipt of the multimedia contents received from another individual multimedia content broadcasting equipment.

The individual multimedia content broadcasting equipment has an expandable independent network for an individual broadcast through a relay broadcast function.

The individual multimedia content broadcasting equipment is a fixed broadcast device or a mobile broadcast device.

To achieve the above objects, in an individual multimedia content broadcasting system which includes a receiving terminal, a radio network, and an individual multimedia content broadcasting equipment, there is provided an individual multimedia content broadcasting system which comprises a receiving terminal which requests a connection to an individual multimedia content broadcasting equipment through a radio network depending on a viewer's request, and receives an allocation of a private IP address, and is connected, and receives a broadcasting content from the individual multimedia content broadcasting equipment and plays back the same; and an individual multimedia content broadcasting equipment which creates and stores a broadcast multimedia content depending on a broadcaster's operation, and allocates a private IP address depending on a connection request of the receiving terminal, and forms the radio network, and transmits the broadcast multimedia contents to the receiving terminal depending on the broadcaster's operation.

The radio network uses either an ISM radio frequency band or a 5 GHz UNII radio frequency band.

The radio network is an independent network for an individual broadcast by using a private IP address through a DHCP function of the individual multimedia content broadcasting equipment.

The individual multimedia content broadcasting system further includes an individual multimedia content broadcasting relay equipment which receives an allocation of the private IP address from the individual multimedia content broadcasting equipment and receives an individual broadcast and relays an individual broadcast depending on a request of the receiving terminal in a region of the relay radio network which requests the received individual broadcast view.

To achieve the above objects, there is provided an individual multimedia content broadcasting method performed in an individual media content broadcasting system which includes a radio network, a receiving terminal and an individual multimedia content broadcasting equipment, which comprises (a) selecting a broadcasting multimedia content with (as) a broadcaster's operation; (b) receiving a connection request from a receiving terminal in a region of the radio network; (c) providing a private IP address to a receiving terminal, which requested a connection, for thereby forming and connecting an individual broadcasting independent radio network; (d) receiving an authentication information from the receiving terminal and performing an authentication of a receiving terminal, when an authentication step is set; (e) retrieving the private IP address disconnecting the connection when an authentication is failed, or judging whether a playback tool is installed or not in the receiving terminal when an authentication is succeeded and installing the playback tool on the receiving terminal when it is not installed; and (f) transmitting a broadcast multimedia content selected by broadcaster to the receiving terminal.

To achieve the above objects, there is provided an individual multimedia content broadcasting method performed in an individual multimedia content broadcasting system which includes a radio network, a receiving terminal, an individual multimedia content broadcasting equipment, and an individual multimedia content broadcasting relay equipment, (1) selecting, by an individual multimedia content broadcasting equipment, a broadcasting multimedia content with a broadcaster's operation; (2) receiving, by an individual multimedia content broadcasting equipment, a connection request from the individual multimedia content broadcasting relay equipment in a radio network region; (3) providing, by an individual multimedia content broadcasting equipment, a private IP address to the individual multimedia content broadcasting relay equipment which requested a connection for thereby forming an individual broadcasting independent radio network; (4) transmitting, by an individual multimedia content broadcasting equipment, a broadcasting multimedia content to the individual multimedia content broadcasting relay equipment; (5) receiving, by an individual multimedia content broadcasting relay equipment, a connection from a receiving terminal in a region of a relay radio network; (6) providing, by an individual multimedia content broadcasting relay equipment, a private IP address to a receiving terminal which requests a connection for thereby forming a relay broadcasting independent radio network; (7) receiving, by an individual multimedia content broadcasting relay equipment, an authentication information from the receiving terminal for thereby performing an authentication of the receiving terminal; (8) retrieving the private IP address and disconnecting the connection when an individual multimedia content broadcasting relay equipment fails an authentication, or judging whether a playback tool is installed or not in the receiving terminal when the authentication is succeeded, and installing the tool when the tool is not installed; and (9) transmitting, by an individual multimedia content broadcasting relay equipment, the broadcast multimedia content received by the individual multimedia content broadcasting relay equipment.

EFFECTS

In the present invention, since it is possible to broadcast individual multimedia contents whose intellectual properties belong to individuals by using an ISM radio frequency band or a 5 GHz UNII radio frequency band which can be used for free by individuals for a radio communication within a shorter distance in a specific region or a building in a range which does not interfere with the communications of other radio stations for thereby providing individual users with an economical advantage for the use of a free radio frequency. Since a private IP address is used for setting a connection to a receiving terminal, an economical advantage can be also obtained as compared to the use of a public IP. Since an authentication function is operational, a connection to a receiving terminal can be controlled by an individual. When there is not a multimedia contents playback tool in a receiving terminal which requests a connection, a playback tool can be automatically installed, and a connection state of a connected receiving terminal can be checked in real time for an efficient management.

In addition, the present invention allows an individual user to easily set an individual multimedia contents broadcast.

BEST MODE FOR CARRYING OUT THE INVENTION

Figure 1:
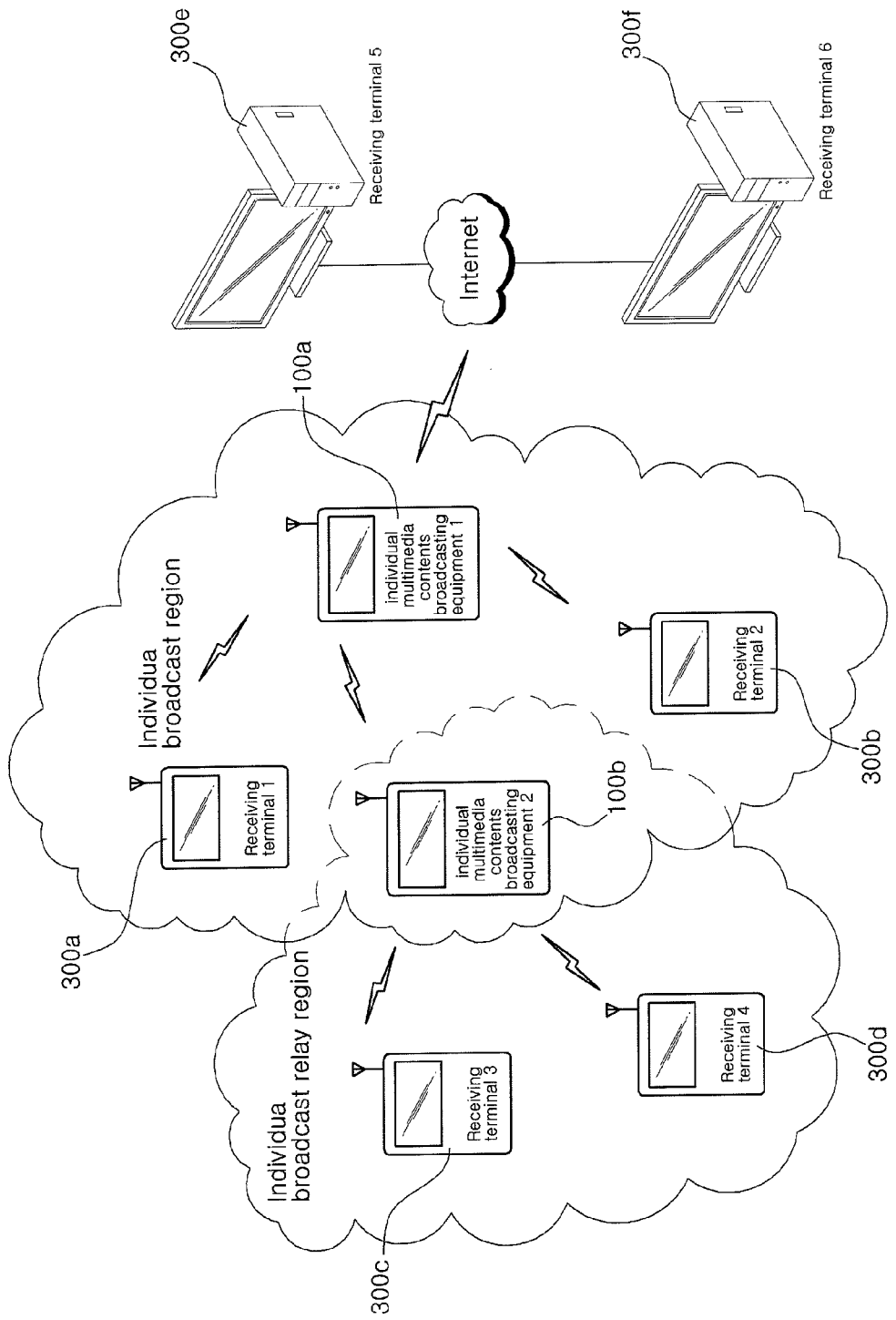
FIG. 1 is a schematic view of an individual multimedia contents broadcasting system according to an embodiment of the present invention.

FIG. 1 is a schematic view of an individual multimedia contents broadcast system according to a preferred embodiment of the present invention. As shown in FIG. 1, an individual multimedia contents broadcast system according to the present invention comprises a receiving terminal 300, a radio network, and an individual multimedia contents broadcasting equipment 100a.

The receiving terminal 300 is connected to an individual multimedia contents broadcasting equipment 100a as it requests a connection to an individual multimedia contents broadcasting equipment 100a through a radio network formed by means of an individual multimedia contents broadcasting equipment 100a depending on a user's operation and receives a private IP. The receiving terminal 300 is capable of receiving and playing back the broadcast contents from the individual multimedia contents broadcasting equipment 100a.

The receiving terminal 300 might be a mobile communication terminal having an input unit such as an operation unit 104a, an output unit such as a speaker 104d and a LCD 104e, and a radio communication unit 102 for a data receiving and transmission through the radio network or might be a portable individual information communication instrument such as a PDA, a palm top computer, a UMPC, a navigation device, a portable game unit or the like. Here, the radio network according to the present invention is constructed to perform a radio data communication based on the IEEE 802.11 protocol. So, there is provided a radio communication unit 102 which supports a data communication based on the IEEE 802.11 protocol. The radio network according to the present invention might be configured to use various universal radio data communication protocols except for the IEEE 802.11 if necessary. The construction and functions of the receiving terminal 300 will be described later with reference to FIG. 3.

The individual multimedia contents broadcasting equipment 100a creates and stores broadcast multimedia contents depending on a broadcaster's operation and allocates a private IP address depending on a connection request of the receiving terminal 300 and forms a radio network and transmits a broadcast multimedia content selected by means of a broadcaster's operation. The individual multimedia contents broadcasting equipment 100a might be equipped with an input unit such as an operation unit 104a, a microphone 104b, a camera 104c or something, an output unit such as a speaker 104d, a LCD 104e or something, a mobile communication terminal having a radio communication unit 102 for a data receiving and transmission through a radio network, and an individual information communication instrument such as a PDA, a palm top computer, a UMPC, a navigation device, a portable game unit or something. The functions and constructions of the individual multimedia contents broadcast equipment 100a will be described with reference to FIGS. 2A and 2B.

Here, the radio network created and maintained by means of the individual multimedia contents broadcasting equipment 100a is designed to use an ISM (Industrial, Science and Medical) radio frequency band or a 5 GHz UNII radio frequency band. The ISM radio frequency band is a frequency band allocated by the FCC for the use in industry, a science and a medical field. 902~928 MHz, 2.4 G~2.4835 GHz and 5.725 GHz~5.835 GHz frequency bands are set for the ISM bands. These frequency bands are not needed to have any permission for a frequency allocation. The output of the equipment which uses the above frequency bands is 17 dBm/50 mW. The 5 GHz UNII radio frequency band is a frequency band used in the IEEE 802.11a and HIPERLAN/2 which also does not need any permission for a frequency allocation.

In the present invention, 802.11a, 802.11b or 802.11g might be used or properly combined for a LAN radio communication. The 802.11a, 802.11b and 802.11g are the protocols for a radio LAN developed by the IEEE work group. The above three protocols use CSMA/CA which is an Ethernet protocol. The 802.11b provides a rate of 11 Mbps per second, whereas the latest 802.11g provides a relatively shorter distance communication at a rate of 54 Mbps in maximum. Since the 802.11g works in a 2.4 GHz band like 802.11b, there is compatibility between the above two protocols. The modulation method used in 802.11 is traditionally PSK, but the modulation applied in 802.11b provides a faster data transmission rate, and uses CCK which is not interfered with multiplexed transmission passages. The 802.11a is generally used in a radio ATM system, namely in an access hub. The 802.11a is applied in a radio frequency bandwidth of 5 GHz-6 GHz. The 802.11a uses a modulation method which is called an OFDM for a data transmission rate up to 54 Mbps in maximum.

In case of 5 GHz band, since it is a relatively higher frequency, it is not proper that other small compact sized radio devices might compete with one another for frequencies. The IEEE 802.11a has much less interferences by means of other devices as compared to the IEEE 802.11b and advantageously supports a faster transmission rate of 54 Mbps. It is preferred that the radio network according to the present invention is configured in an independent network for a personal broadcasting service provided using a private IP address through a DHCP function of the individual multimedia contents broadcasting equipment 100a.

It is disadvantageous that the IEEE 802.11a, IEEE 802.11b, and IEEE 802.11g might be used only for the LAN radio communication. So as to overcome the above disadvantages, the individual multimedia contents broadcasting equipment according to the present invention might be further equipped with an individual multimedia contents relay broadcasting equipment 100b. The individual multimedia contents relay broadcasting equipment 100b is configured in the same manner as the individual multimedia contents broadcasting equipment 100a. A private IP address is allocated from the individual multimedia contents broadcasting equipment 100a in a radio communication radius of the individual multimedia contents broadcasting equipment 100a, and the individual broadcast received depending on a request of the receiving terminal 300c in a relay radio network range, which requests a received individual broadcast viewing, is relayed. Namely, the individual multimedia contents broadcasting system according to the present invention can overcome the problems of the radio data communication radius by using the individual multimedia contents relay broadcasting equipment 100b, so it is possible to watch an individual broadcast from a relatively farther distance.

Figure 2A:
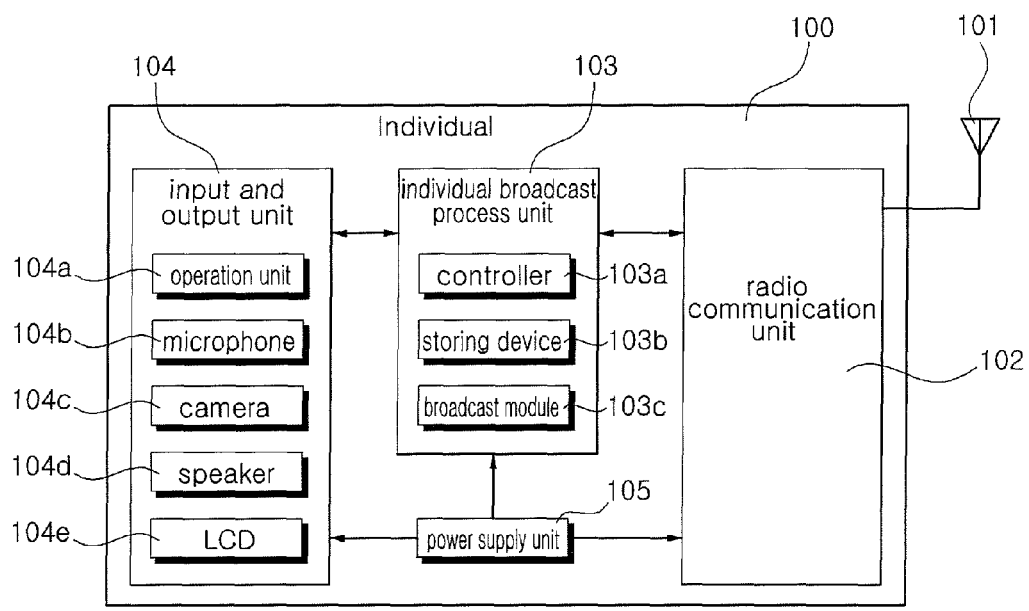
FIG. 2A is a block diagram of a physical internal construction of an individual multimedia contents broadcasting equipment in an individual multimedia contents broadcasting which uses an ISM radio frequency band or a 5 GHz UNII frequency band according to an embodiment of the present invention.

FIG. 2A is a block diagram of a physical internal construction of an individual multimedia contents broadcasting equipment in an individual multimedia contents broadcasting which uses an ISM radio frequency band or a 5 GHz UNII radio frequency band.

As shown in FIG. 2A, the individual multimedia contents broadcasting equipment 100a according to the present invention comprises an input and output unit 104, an individual broadcast process unit 103, a radio communication unit 102, an antenna 101, and a power supply unit 105.

The input and output unit 104 includes an input part and an output part. The input part is formed of at least one among an operation unit 104a for receiving a control signal based on a broadcaster's operation, a microphone 104b for receiving a sound data, and a camera 104c for receiving a video data. The output part is formed of at least one between a speaker 104d for outputting a sound data, a LCD 104e for outputting a video data and something. Here, the operation unit 104a represents an input device such as a keypad, a keyboard, a mouse, a touch screen or something. The microphone 104b and the camera 104c might be formed of a microphone 104b and a camera 104c provided in the individual multimedia contents broadcasting equipment 100a or might be formed of an external microphone 104b and a camera 104c connected through an interface part such as a USB port. The input and output unit 104 is configured by using a known art. So, the detailed descriptions of the same will be omitted.

The individual broadcast process unit 103 creates and stores broadcast contents using a data inputted through an input unit and provides a receiving terminal, which requests a connection, with a private IP address for thereby connecting through a radio network and transmits broadcast contents to the receiving terminal connected. More preferably, the individual broadcast process unit 103 according to the present invention includes a broadcast module 103c, a storing device 103b and a controller 103a.

The broadcast module 103c creates and stores broadcast contents using a data inputted through an input unit depending on a broadcaster's operation and provides a private IP address to the receiving terminal 300 which requests a connection for thereby connecting through a radio network and transmits an individual multimedia content to the connected receiving terminal 300 based on a broadcaster's selection. At this time, the individual broadcasting multimedia contents broadcasted through the receiving terminal 300 according to the present invention might be a text data, a symbol data, a music data inputted through the microphone 104b, a sound data, an audio data, a video data inputted through the camera 104c, an image data, a photo data or a combination of the same.

The individual broadcasting multimedia contents according to the present invention might be an individual broadcasting multimedia content created in real time from the broadcasting module 103c depending on a broadcaster's operation, an individual broadcasting multimedia content stored in the storing device 103b, an individual broadcasting multimedia content created in real time, an individual broadcasting multimedia content stored in the storing device 103b or a combination of the same and might be transmitted. When a broadcaster selects a real time broadcast by operating the individual multimedia contents broadcasting equipment 100a, the individual multimedia contents broadcasting equipment 100a according to the present invention creates an individual broadcasting multimedia content using a sound data, an audio data, a text data and a video data inputted in real time from the input unit, and transmits in real time to the receiving terminal 300. When the broadcaster selects a recording broadcast, the individual broadcasting multimedia content previously created and stored in the storing device 103b is transmitted to the receiving terminal 300. When the broadcaster selects a combined content (for example, when a specific content previously created and stored in the storing device 103b is selected as a background image, and when it is combined with a motion image inputted in real time on the background image and it is broadcasted), the contents combined with the individual broadcasting multimedia contents created in real time and the individual broadcasting multimedia contents stored in the storing device 103b are transmitted to the receiving terminal 300.

The storing device 103b includes various programs used for driving the individual multimedia contents broadcasting equipment 100b and stores an individual broadcasting multimedia content created from the broadcasting module 103c depending on a broadcaster's selection. The storing device 103b might be formed of various universal storing devices such as a hard disk drive, a ram disk drive or something.

The controller 103a controls a broadcast module 103c, a storing device 103b, an input and output unit 104 and a radio communication unit 102 depending on a control signal inputted through the operation unit 104a, and creates an individual broadcasting multimedia content and performs an individual multimedia contents broadcasting.

The radio communication unit 102 forms a radio network and performs a data communication with the receiving terminal 300 connected through a radio network and is configured to substantially support the IEEE 802.11a, IEEE 802.11b, IEEE 802.11g, IEEE 802.11n which are selected depending on the needs in the individual multimedia contents broadcasting system according to the present invention.

Figure 2B:
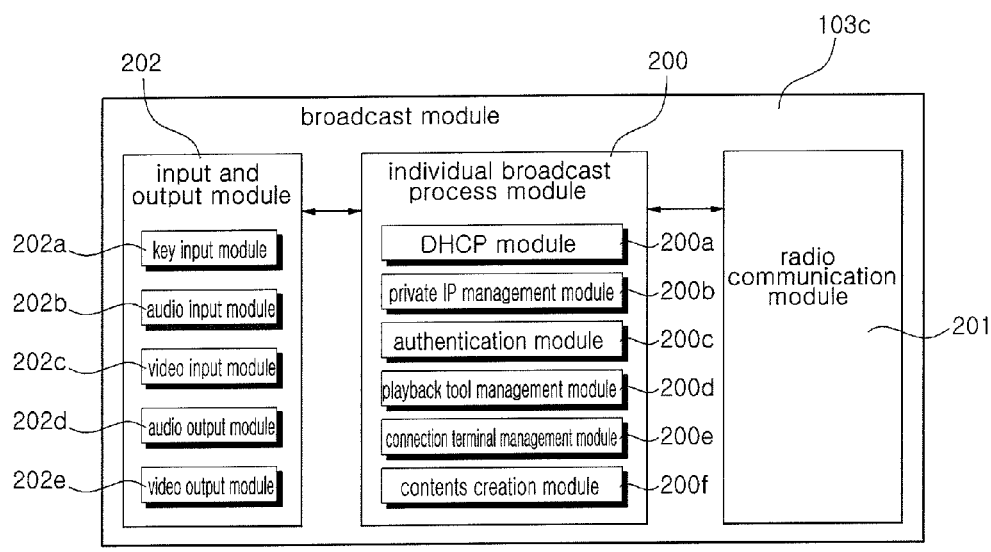
FIG. 2B is a block diagram of a logical internal construction of an individual multimedia contents broadcasting equipment in an individual multimedia contents broadcasting which uses an ISM radio frequency band or a 5 GHz UNII radio frequency band according to an embodiment of the present invention.

As shown in FIG. 2B, the broadcast module 103c according to the present invention comprises an input and output module 202, an individual broadcast process module 200, and a radio communication module 201. The input and output module 202 is a device drive of an input and output unit and controls a data input through the input unit and a data output through the output unit, and the radio communication module 201 is a device drive of the radio communication unit 102 and controls the radio communication unit 102 and broadcasts the individual broadcasting multimedia contents on the receiving terminal 300 depending on the broadcaster's operation.

The individual broadcast process module 200 is a key module for performing an individual multimedia contents broadcasting according to the present invention and creates and stores a multimedia content using the data inputted from the input unit and allocates a private IP address through a DHCP (Dynamic Host Configuration Protocol) to the receiving terminal which requested a connection and sets a connection or retrieves the provided private IP address and disconnects the connection and transmits an individual broadcasting multimedia content to the connected receiving terminal 300 based on the broadcaster's selection. So as to perform the above operations, the individual broadcast process module 200 comprises a DHCP module 200a, a private IP address management module 200b, an authentication module 200c, a playback tool management module 200d, a connection terminal management module 200e, and a content creation module 200f.

The content creation module 200f creates a text data and a symbol data inputted through the individual broadcasting multimedia content operation unit 104a using a data inputted through the input unit, a music data, a sound data and an audio data inputted through the microphone 104b, and a video data, an image data and a photo data inputted through the camera 104c and combines the same. So as to perform the above operations, the content creation module 200f according to the present invention is configured to support a text/symbol input function, a music/sound encoding function, a photo/motion picture encoding function or something. It further supports a combining and encoding function for a mixed content creation. Here, the encoding codes might be selected from mp3, wma, jpg, asp, mpeg, xvid or something. An exclusive codec might be used.

The DHCP module 200a allocates a private IP address through a DHCP function to the receiving terminal 300 connected, and sets a connection or retrieves the allocated private IP address and disconnects the connection. Namely, the DHCP module 200a according to the present invention performs a DHCP server function and sets a private IP address in the receiving terminal 300, which requested a connection in an individual broadcasting independent radio network, by using a private IP address information stored in the private IP address management module, so the individual broadcasting independent radio network might be configured, and the individual broadcasting might be watched.

The private IP address management module 200b stores and manages a private IP address information to be allocated to the receiving terminal 300, and a private IP address information allocated to the current receiving terminal 300. The private IP address information created and stored by the private IP address management module 200b is referred by means of the DHCP module 200a, so a private IP address to be allocated to the receiving terminal 300 is determined. When the private IP address is allocated to the receiving terminal 300 or is retrieved, and the connection is disconnected, the above operation is updated in real time.

The playback tool management module 200d judges whether the content playback tool is installed or not in the connected receiving terminal 300. When it is not installed, the multimedia content playback tool stored in the storing device 103b is transmitted to the receiving terminal 300 and is automatically installed, so the multimedia contents can be played back. At this time, the multimedia content playback tool installed in the receiving terminal 300 is configured to decode the encoded multimedia data depending on the adapted encoding codec or a codec previously installed in the receiving terminal 300 might be used or a certain codec might be previously installed in the multimedia content playback tool.

When the broadcaster selects an authentication function, the authentication module 200c performs an authentication using terminal information, so that only the authenticated receiving terminal 300 can view an individual broadcast. So as to perform the above operations, the authentication module receives registration information from a new terminal (or user) who wants to view the individual broadcast, and creates an authentication information and stores in the storing device 103b, for thereby finishing a new registration. The authentication information stored in the storing device 103b is compared with the authentication information (terminal information or user information) received from the connected receiving terminal, so a needed authentication is performed. As a result, when the authentication is succeeded, the content receipt of the receiving terminal 300 is permitted, and when the authentication is failed, the private IP address provided to the receiving terminal 300 is retrieved, and the connection is finished.

The connection terminal management module 200e monitors in real time connection information including at least one among the number of connected receiving terminals, a connection state, a radio communication sensitivity or something and displays the current connection information on the LCD 104e temporarily or periodically depending on the previously set information and provides to the broadcaster in real time. The real time connection information monitored by means of the connection terminal management module 200e is stored in the storing device 103b in a DB form. The connection terminal management module 200e extracts and provides connection information stored in the database when the broadcaster requests a connection data such as connection information of a certain time period or a specific time section or provides the broadcaster with a statistic data.

The individual multimedia contents broadcasting equipment 100b according to the present invention receives an allocation of the private IP address from other individual multimedia contents broadcasting equipments 100a for thereby receiving the contents broadcasted by means of another individual multimedia contents broadcasting equipment 100a. So, the individual multimedia contents broadcasting equipment 100b according to the present invention performs a relay broadcast in a relay region where requests a receipt of the multimedia contents received from another individual multimedia contents broadcasting equipment 100a. The individual multimedia contents broadcasting equipment 100b having a relay function is formed in the same construction as the individual multimedia contents broadcasting equipment 100a which performs the above broadcasting functions, provided that there are differences only in the contents received from the individual multimedia contents broadcasting equipment 100a. So, the construction and operations of the same will be omitted. The above relay function is provided for overcoming the limits in the LAN radio communication radius. When the relay function is used, an expansion of the independent radio network for an individual broadcast might be possible. The relay function will be described later with reference to FIGS. 5 and 6.

The individual multimedia contents broadcasting equipment 100a according to the present invention might be configured in fixed broadcast equipment or portable broadcast equipment. In case of the fixed type, an individual information communication instrument such as a desk top system except for a portable or mobile communication instrument might be used. In case of the portable type, a portable individual information communication instrument such as a mobile communication terminal, a PDA, a palm top computer, a UMPC, a navigation device, a portable game unit or something might be used. The individual multimedia contents broadcasting equipment 100b having a relay function might be a mobile system while maintaining a radio communication radius which is a relatively shorter distance as compared to the fixed type.

Figure 3:
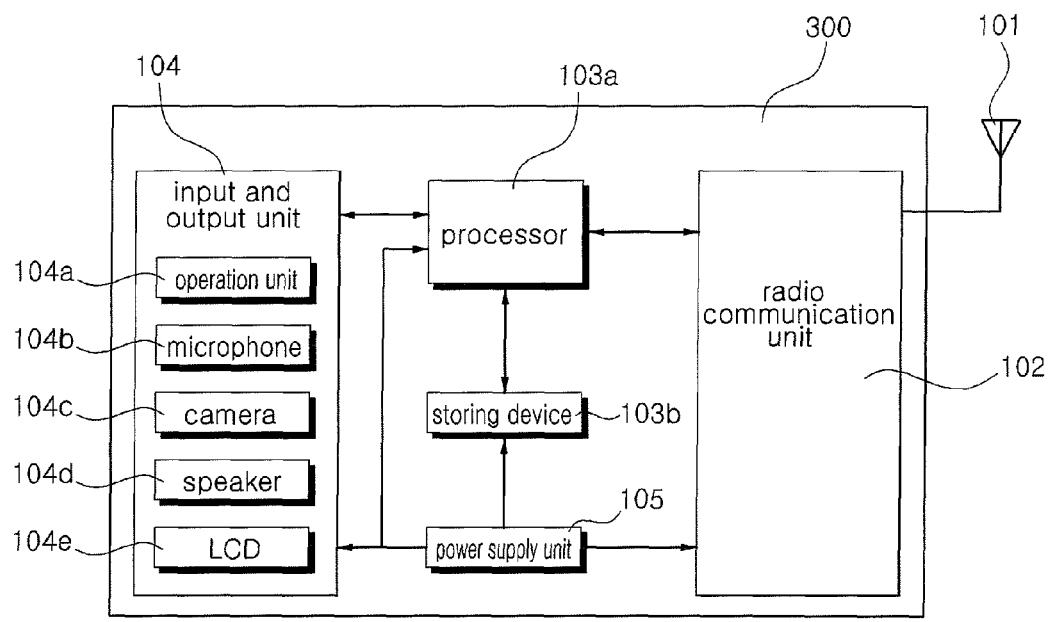
FIG. 3 is a block diagram of an inner construction of a receiving terminal which is capable of receiving an individual broadcast in an individual multimedia contents broadcasting which uses an ISM radio frequency band or a 5 GHz UNII radio frequency band according to an embodiment of the present invention.

FIG. 3 is a block diagram of an inner construction of a receiving terminal which is capable of receiving individual multimedia contents broadcasting which uses an ISM radio frequency band or a 5 GHz UNII radio frequency band.

As shown in FIG. 3, the receiving terminal 300 according to the present invention comprises an antenna 10a, a radio communication unit 102, a processor 103a, a storing device 103b, an input and output unit 104, and a power supply unit 105. The above elements are key parts in the individual information communication instrument and operate in the same manner as the elements of the individual multimedia contents broadcasting equipment 100a. So, the detailed descriptions of the same will be omitted. The receiving terminal 300 according to the present invention is equipped with a multimedia contents playback tool (not shown) which is used for playing back the contents from the individual multimedia contents broadcasting equipment 100a. When the logically operable broadcast module 103c is integrally provided in the system, not being independent from the contents playback tool, and is installed in the receiving terminal 300, the receiving terminal 300 receives broadcast contents from the other receiving terminal (individual multimedia contents broadcasting equipment 100a) and plays back the same. When the user wants, the user can perform own individual broadcast using the broadcast module 103c. When the broadcast module 103c and the contents playback tools are separately installed, it is needed to install both the broadcast module 103c and the contents playback tool for each corresponding function.

Figure 4:
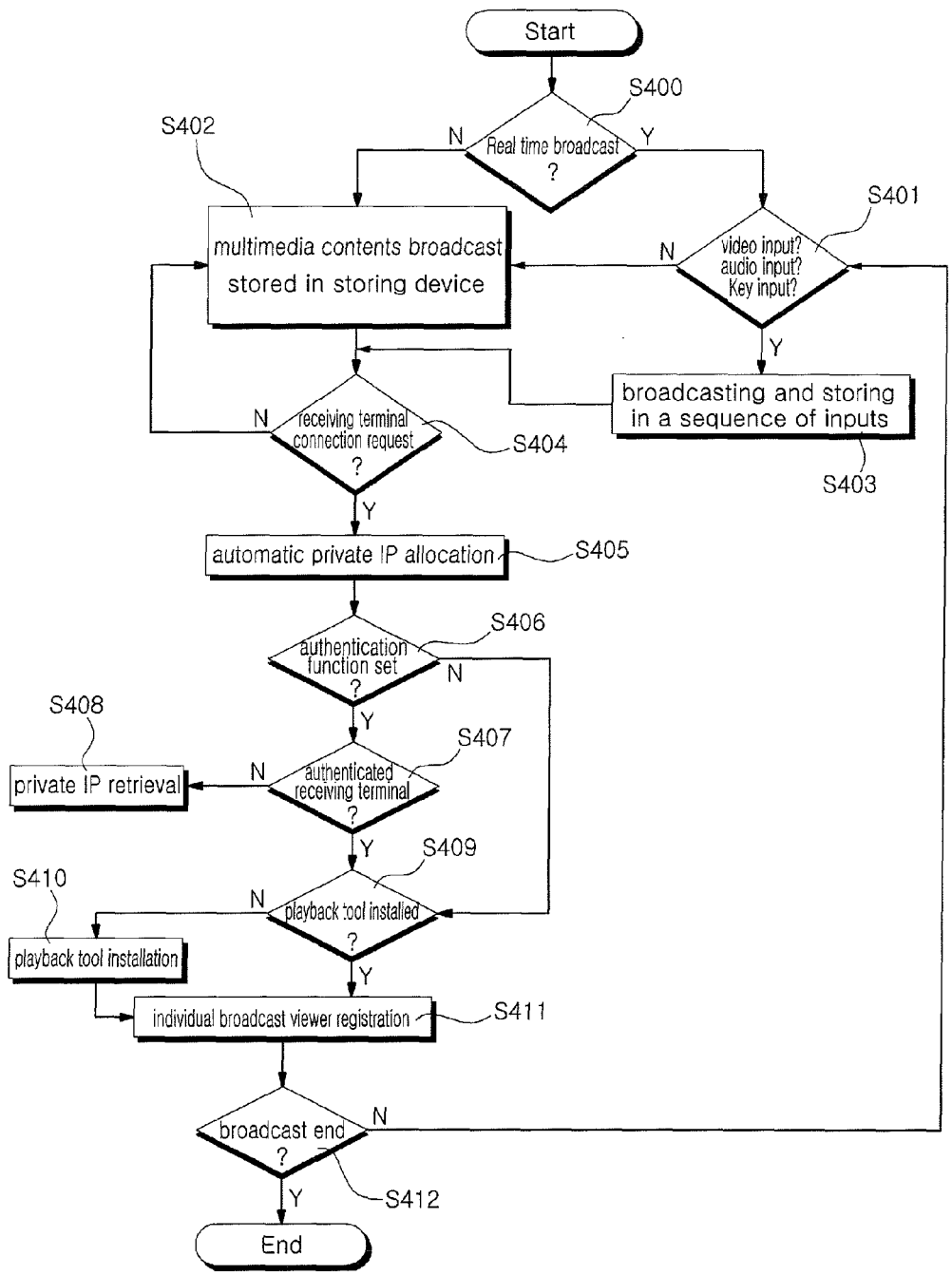
FIG. 4 is a flow chart of an individual broadcast procedure of an individual multimedia contents broadcasting equipment in an individual multimedia contents broadcasting which uses an ISM radio frequency band or a 5 GHz UNII radio frequency band according to an embodiment of the present invention.

FIG. 4 is a flow chart of an individual broadcast procedure of the individual multimedia contents broadcasting equipment in the individual multimedia contents broadcasting which uses an ISM radio frequency band and a 5 GHz UNII radio frequency band according to the present invention. The individual broadcast manufacturing method according to the present invention will be described with reference to FIG. 4.

An individual broadcast driving instruction inputted through the operation unit 104a depending on a broadcaster's operation is interpreted by means of a key input module 202a, and is transmitted to the controller 103a. The controller 103a judges whether the multimedia contents stored in the storing device 103b are broadcasted or the multimedia contents inputted through the input and output unit 104 are broadcasted in real time in a step S400.

In case that the individual broadcast driving instruction corresponds to a recording broadcast in which the multimedia contents stored in the storing device 103b are broadcasted, the controller 103a transmits the multimedia contents stored in the storing device 103b to the radio communication instrument 102, and a corresponding broadcast beings in a step S402.

When the broadcaster selects a real time broadcast, the text data and symbol data inputted trough the operation unit 104a are interpreted by means of the key input module 202a, and the music data, audio data and sound data inputted through the microphone 104a are interpreted by means of the audio input module 202b, and the image data, image data, and photo data inputted through the camera 104c are interpreted by means of the video input module 202c. The above data are sequentially transferred to the controller 103a in a step S401. The controller 103a creates multimedia contents in real time in a sequence of the input, and stores into the storing device 103b, and transmits the multimedia contents created in real time through the radio communication unit 102, and the broadcast begins.

In the steps S402 and S403, the multimedia contents, which are individually broadcasted, are outputted to the speaker 104d by the process of the controller 103a, and the music data, audio data and sound data are outputted to the speaker 104d through the audio output module 202d. The video data, image data, and photo data are outputted to the LCD 104e through the video output module 202e. The broadcaster performs a broadcast while checking the contents of the multimedia contents which are being broadcasted through the output unit of the individual multimedia contents broadcasting equipment 100a.

In the step S401, when the multimedia contents stored in the storing device 103b with a periodically repeated judgment process after the individual broadcast has begun are broadcasted, the multimedia contents inputted through the input and output device 104 are combined with the multimedia contents of the storing device 103*b* depending on the process of the processor 103*a* as a result of the judgment of the step S401 and are broadcasted.

Next, the controller 103*a* judges a connection request of the receiving terminal 300. When there is a request, a private IP address allocable to the receiving terminal 300 which requested a connection with reference to the current private IP address information managed by means of the private IP address management module 200*b* through the DHCP module 200*a* is selected and automatically allocated to the receiving terminal for thereby setting a connection in steps S404 and S405.

When an authentication function is not activated after a connection is set, the authentication module 200*c* receives authentication information from the connected receiving terminal 300 and compares with the authentication information stored in the storing device 103*b* for thereby judging whether the connected receiving terminal is the receiving terminal 300 registered in the connection terminal management module 200*e* in steps S406 and S407.

As a result of the judgment of the registration, when the connected receiving terminal is not the authenticated receiving terminal 300, the allocated private IP address is retrieved, and the connection is automatically disconnected, and the broadcast receipt is prohibited in a step S408, and in case of the authenticated receiving terminal, the step S409 is performed.

Next, the controller 103*a* judges whether there is a playback tool in the authenticated receiving terminal 300 for playing back the broadcast contents with the helps of the playback module 200*d* in a step S409, and when a playback tool is not installed, the playback tool stored in the storing device 103*b* is transmitted to the receiving terminal 300 using the playback tool module 200*d* and is installed in a step S410. When an individual content can be played back in the receiving terminal 300, the controller 103*a* transmits a currently broadcasting content selected by the broadcaster to the receiving terminal 300, and the receiving terminal 300 receives the broadcast content and plays back the same. At this time, the connection terminal management module 200*e* of the individual multimedia contents broadcasting equipment 100 periodically transmits a connection state of the receiving terminal 300 to the video output module 202*e*, and the video output module 202*e* indicates the connection state of the receiving terminal 300 on the LCD 104*e* and periodically manages the same.

When the individual broadcast is continuously performed, the routine is repeated from the step S401 to the step S412. When it is judged that the individual broadcast is finished, the individual broadcast operation is stopped in a step S412.

Figure 5:
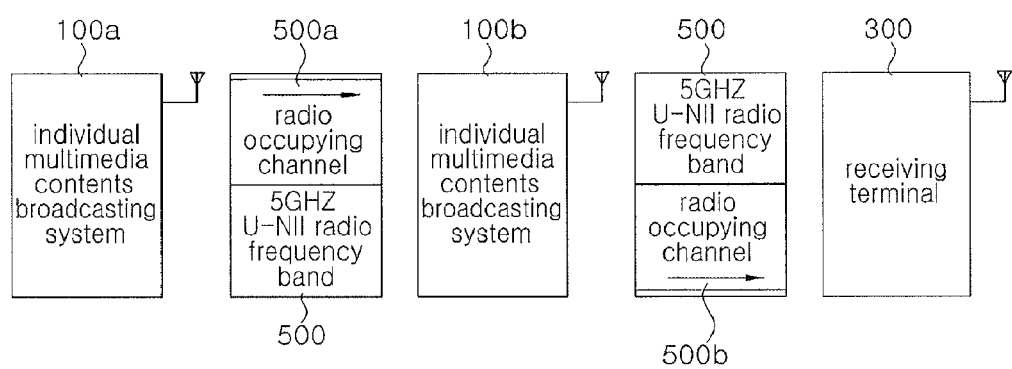
FIG. 5 is a view of a relay broadcast method of an individual multimedia contents broadcasting equipment in an individual multimedia contents broadcasting which uses an ISM radio frequency band or a 5 GHz UNII radio frequency band according to an embodiment of the present invention.
Figure 6:
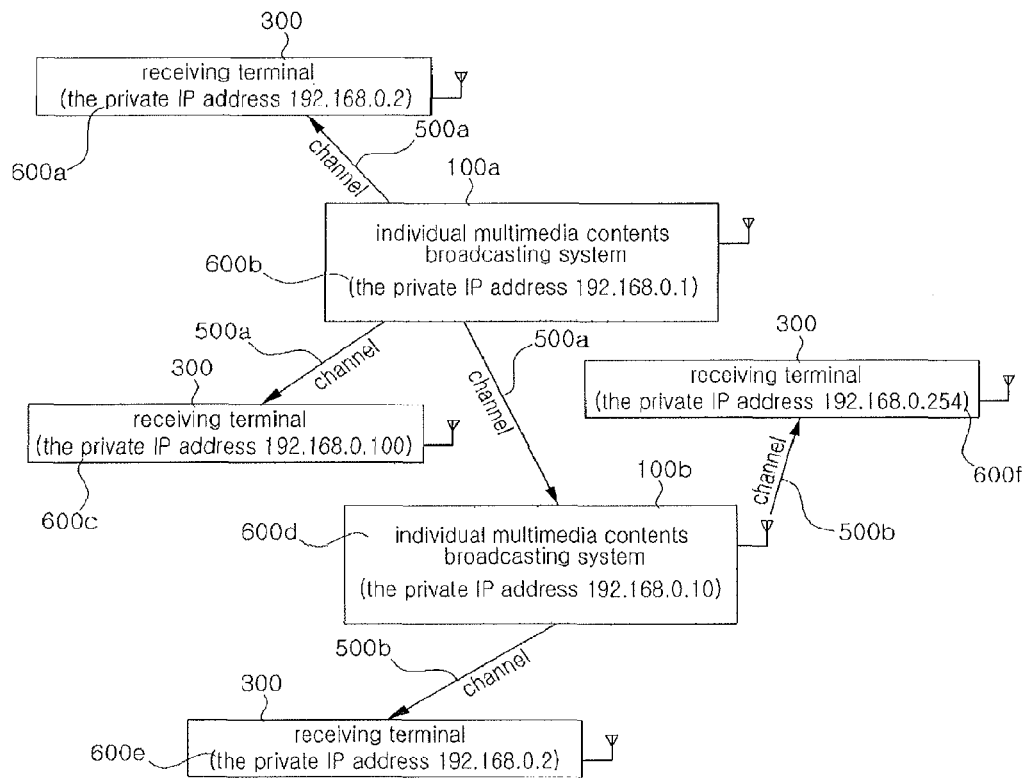
FIG. 6 is a view of an individual multimedia contents broadcasting service method in an individual multimedia contents broadcasting which uses an ISM radio frequency band or a 5 GHz UNII radio frequency band according to an embodiment of the present invention.

FIG. 5 is a view of a relay broadcast method of an individual multimedia contents broadcasting equipment in an individual multimedia contents broadcasting which uses an ISM radio frequency band or a 5 GHz UNII radio frequency band according to an embodiment of the present invention. FIG. 6 is a view of an individual multimedia contents broadcasting service method in an individual multimedia contents broadcasting which uses an ISM radio frequency band or a 5 GHz UNII radio frequency band according to an embodiment of the present invention.

The relay broadcast system and method according to the present invention will be described with reference to FIGS. 5 and 6.

As shown in FIGS. 5 and 6, the individual multimedia contents broadcasting equipment 100*b* is capable of performing individual multimedia contents broadcast, and is capable of receiving and relaying the multimedia contents which are being broadcasted in another individual multimedia contents broadcasting equipment 100*a*. Namely, an individual broadcast mode or a relay mode is set by means of the operation unit 104*a*, a connection is requested to another individual multimedia contents broadcasting equipment 100*a* which is performing an individual broadcast by means of the operation of the processor 103*a*, and a private IP address is allocated, and its registration information is transmitted. The multimedia contents, which are being individually broadcasted through the radio occupying channel 500*a* of the ISM radio frequency band or the 5 GHz UNII radio frequency band 500 from another individual multimedia contents broadcasting equipment 100*a*, which is performing an individual broadcast, are received, and played back by means of the speaker 104*d* and the LCD 104*e*. In addition, the received multimedia contents are relayed to another individual multimedia contents broadcasting equipment (not shown), which is set in a receiving mode or a relay mode, by allocating a channel 500*b* which might be used in the ISM radio frequency band or the UNII radio frequency band 500 except for the occupying channel 500*a*. The receiving terminal 300 might be connected to the individual multimedia contents broadcasting equipment 100*a* which performs an individual broadcast or might be connected to the individual multimedia contents broadcasting equipment 100*b* which relays an individual broadcast, which broadcasts are same. As shown in FIG. 6, the individual multimedia contents broadcasting equipment 100*a* defined with the private IP address 192.168.0.1 (600*b*) allocates the private IP address 192.168.0.2 (600*a*); 192.168.0.100 (600*c*) to the receiving terminal 300 which wants to receive a broadcast in a nearby region where is able to receive the individual broadcast, and allocates the private IP address 192.168.0.10 (600*d*) to the individual multimedia contents broadcasting equipment 100*b*, which is in the current broadcast mode, for thereby providing an individual broadcast service through the occupying channel 500*a*. At this time, the individual multimedia contents broadcasting equipment 100*b*, which is in the relay broadcast mode and has received the allocation of the private IP address 192.168.0.10 (600*d*), allocates the private IP address 192.168.1.2 (600*e*); 192.168.1.254 (600*f*) to the receiving terminal 300 in the nearby region, and the individual broadcast is received through the available channel 500*b*. Here, the private IP address and channels can be reused. The above features are not limited to the disclosed features of FIGS. 5 and 6.

INDUSTRIAL APPLICABILITY

As described above, the present invention relates a personal multimedia contents broadcasting equipment and a method thereof which provide functions for broadcasting multimedia contents such as a text data, a symbol data, a music data, a sound data, an audio data, a video data, an image data, a photo data or something, with their intellectual properties belonging to individuals, respectively, to a specific receiving terminal by using an ISM radio frequency band or a 5 GHz UNII radio frequency band.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

The invention claimed is:

1. An equipment for broadcasting multimedia content, said equipment comprising:
 a radio communication unit and an individual broadcast processing unit,
 wherein said radio communication unit is configured to:
  form a radio network,
  communicate data via said radio network to a receiving terminal, and
  forward communication requests to the individual broadcast processing unit; and
 wherein said individual broadcast process unit is configured to:
  receive connection requests for a connection to said radio network which were forwarded by said radio communication from a receiving terminal, and
  reply with a private IP address through Dynamic Host Configuration Protocol (DHCP) in order to establish a connection through the radio network to the receiving terminal and then transmit a broadcast content to the receiving terminal.

2. The equipment of claim 1, wherein said equipment further includes:
 an input unit which has at least one among an operation unit, a microphone and a camera for producing multimedia contents; and
 an output unit which has a display unit and a speaker for playing back the broadcasting multimedia contents, and said individual broadcasting process unit creates and stores a broadcast content using a data inputted through the input unit and outputs the multimedia contents stored or received through the output unit.

3. The equipment of claim 2, wherein said radio network uses either an ISM (Industrial Science and Medical) radio frequency band or a 5 GHz UNII radio frequency band.

4. The equipment of claim 2, wherein said individual broadcasting process unit further includes:
 a controller;
 the controller to execute broadcast module which creates and stores a broadcast content using a data inputted through the input unit and provides a temporary IP address to the receiving terminal, which requests a connection, and makes a connection of the receiving terminal through a radio network, and transmits a broadcast content to the connected receiving terminal; and
 a storing device which stores an individual broadcast multimedia content created by the controller executing the broadcast module;
 wherein the controller controls the broadcast module, the storing device, the input unit, the output unit and the radio communication unit in accordance with a control signal inputted through the input unit for thereby performing an individual multimedia content broadcast.

5. The equipment of claim 4, wherein said equipment transmits one content among an individual broadcasting multimedia content created in real time from the controller executing a content creation module, an individual broadcast multimedia content stored in the storing device, an individual broadcast multimedia content which is created in real time, and a content which is combined with the individual multimedia contents stored in the storing device.

6. The equipment of claim 4, wherein the controller to execute said broadcast module includes:
 the controller to execute an input and output module for controlling a data input through the input unit and a data output through the output unit;
 the controller to execute an individual broadcast process module which creates a multimedia content in real time by using a data inputted through the input unit, and allocates a private IP address through a DHCP function on the receiving terminal which requests a connection, and sets a connection, and retrieves the provided private IP address and disconnects the connection; and
 the controller to execute a radio communication module which broadcasts an individual broadcast multimedia content based on the broadcaster's operation to the connected receiving terminal by controlling the radio communication unit.

7. The equipment of claim 6, wherein the controller to execute said individual broadcast process module includes:
 the controller to execute a content creation module which creates a multimedia content in real time by using a data inputted through the input unit;
 the controller to execute a DHCP module which allocates a private IP address through a DHCP function on a receiving terminal which requests a connection, and sets a connection, and retrieves the allocated private IP address and disconnects the connection; and
 the controller to execute a private IP address management module which stores and manages the private IP address information which might be allocated on the receiving terminal and the allocated private IP address information.

8. The equipment of claim 7, wherein the controller to execute said individual broadcast module includes:
 the controller to execute a playback tool management module which automatically install a multimedia content playback tool when the connected receiving terminal does not have a content playback tool for thereby playing back the multimedia contents;
 the controller to execute an authentication module which performs an authentication by using information from the connected receiving terminal and permits a receipt when the authentication is allowed, and when the authentication is failed, it retrieves the allocated private IP address and disconnects the connection; and
 the controller to execute a connection terminal management module which monitors in real time connection information including at least one between the number of connected receiving terminals and a connection state and indicates the current connection information through the output means periodically.

9. The equipment of claim 1, wherein said radio network is a network for an individual broadcast using a private IP address through the DHCP function.

10. The equipment of claim 1, wherein said equipment further includes an individual multimedia content broadcasting relay equipment which receives an allocation of the private IP address of another individual multimedia content broadcasting equipment for thereby receiving a broadcast.

11. The equipment of claim 10, wherein said individual multimedia content broadcasting relay equipment performs a relay broadcast which requests a receipt of the multimedia contents received from another individual multimedia content broadcasting equipment.

12. The equipment of claim 11, wherein said individual multimedia content broadcasting relay equipment has an expandable independent network for an individual broadcast through a relay broadcast function.

13. The equipment of claim 1, wherein said equipment for broadcasting multimedia content is a fixed broadcast device or a mobile broadcast device.

14. A system comprising:
a receiving terminal;
a radio network; and
an individual multimedia content broadcast equipment,
wherein said receiving terminal is configured to:
  request a connection to the individual multimedia content through the radio network,
  receive a private IP address which indicates connection to the individual multimedia content broadcasting equipment,
  receive individual multimedia content broadcast content from the individual multimedia content broadcasting equipment, and
  playback said received multimedia content to a view;
wherein the individual multimedia content broadcast equipment is configured to:
  form the radio network,
  create and store broadcast multimedia content, and
  upon receiving the connection request from the receiving terminal, allocate the private IP address to the receiving terminal, and transmit the individual broadcast multimedia content to the receiving terminal.

15. The system of claim 14, wherein said radio network uses either an ISM radio frequency band or a 5 GHz UNII radio frequency band.

16. The system of claim 15, wherein said radio network is a network for an individual broadcast, created by using a private IP address through a DHCP function of the individual multimedia content broadcasting equipment.

17. The system of claim 16, wherein said system further includes
  an individual multimedia content broadcasting relay equipment which receives an individual broadcast with an allocation of the private IP address from the individual multimedia content broadcasting equipment and relays the received individual broadcast to the receiving terminal which requests receiving the received individual broadcast in a region of the radio network for relay.

18. An individual multimedia content broadcasting method, said method comprising:
  performing a broadcaster operation to select broadcast multimedia content;
  receiving a connection request to connect to an individual broadcast independent radio network from a receiving terminal;
  replying by providing a private IP address to said receiving terminal;
  upon receiving an authentication request including an authentication information from said receiving terminal, determining whether the receiving terminal is configured for playback and whether the authentication information meets authentication requirements;
  if the authentication information from the receiving terminal meets the authentication requirements and the receiving terminal is configured for playback, transmitting by an individual multimedia content broadcasting equipment the broadcast multimedia content to the receiving terminal;
  if the authentication information from the receiving terminal meets the authentication requirements and the receiving terminal is not configured for playback, installing by the individual multimedia content broadcasting equipment a playback tool on the receiving terminal and transmitting the broadcast multimedia content to the receiving terminal; and
  if the authentication information from the receiving terminal does not meet the authentication requirements, then the individual multimedia the private address then retrieves from the receiving terminal and disconnects the receiving terminal from the independent radio network.

19. An individual multimedia content broadcasting method, the method comprising:
  performing a broadcaster operation to select broadcast multimedia content;
  receiving, by an individual multimedia content broadcasting equipment, a connection request for a connection to an individual broadcast independent radio network from an individual multimedia content broadcasting relay equipment within a radio network region;
  providing, by the individual multimedia content broadcasting equipment, a private IP address to the individual multimedia content broadcasting relay equipment;
  transmitting, by the individual multimedia content broadcasting equipment, the broadcast multimedia content to the individual multimedia content broadcasting relay equipment;
  receiving, by the individual multimedia content broadcasting relay equipment, a request for a connection to the individual broadcast independent radio network from a receiving terminal within a region of the individual broadcast independent radio network;
  replying by providing a private IP address to said receiving terminal;
  upon receiving an authentication request including authentication information from the receiving terminal, determining whether the receiving terminal is configured for playback and whether the authentication information meets authentication requirements;
  if the authentication information from the receiving terminal meets the authentication requirements and the receiving terminal is configured for playback, transmitting by the individual relay multimedia content broadcasting relay equipment the broadcast multimedia content to the receiving terminal;
  if the authentication information from the receiving terminal meets the authentication requirements and the receiving terminal is not configured for playback, installing by the individual multimedia content broadcasting relay equipment a playback tool on the receiving terminal and transmitting the broadcast multimedia content to the receiving terminal; and
  if the authentication information from the receiving terminal does not meet the authentication requirements, then the individual rely multimedia then retrieves the private address from the receiving terminal and disconnects the receiving terminal from the independent radio network.

* * * * *